United States Patent
Löcken et al.

(10) Patent No.: US 7,129,288 B2
(45) Date of Patent: Oct. 31, 2006

(54) POLYURETHANES CONTAINING SULPHIDE GROUPS, POLYMERIC MIXTURES BASED THEREON, PRODUCTION AND USE THEREOF

(75) Inventors: Wilma Löcken, Haltern (DE); Heinz-Peter Rink, Münster (DE); Thomas Krüger, Eisingen (DE); Stefan Schwarte, Emsdetten (DE); Hans-Ulrich Moritz, Bendesdorf (DE); Hartmut Kagerer, Hamburg (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 10/398,132

(22) PCT Filed: Oct. 30, 2001

(86) PCT No.: PCT/EP01/12508

§ 371 (c)(1),
(2), (4) Date: Mar. 31, 2003

(87) PCT Pub. No.: WO02/36655

PCT Pub. Date: May 10, 2002

(65) Prior Publication Data

US 2004/0097688 A1    May 20, 2004

(30) Foreign Application Priority Data

Oct. 31, 2000  (DE)  .................. 100 53 890

(51) Int. Cl.
*C08L 75/04* (2006.01)
*C08L 75/12* (2006.01)
*C09D 175/04* (2006.01)
*C09D 175/12* (2006.01)
*C09J 175/04* (2006.01)

(52) U.S. Cl. ............... 524/507; 522/135; 522/149; 522/162; 522/174; 524/591; 524/839; 524/840; 525/123; 525/127; 525/128; 525/455; 528/61; 528/64; 528/65; 528/85; 528/905

(58) Field of Classification Search ............... 524/507, 524/591, 839, 840; 525/123, 127, 128, 455; 528/61, 64, 65, 85; 522/135, 149, 162, 174
See application file for complete search history.

(56) References Cited

U.S. PATENT DOCUMENTS

| | | | |
|---|---|---|---|
| 3,578,614 A | 5/1971 | Wszolek et al. | 522/68 |
| 3,697,621 A * | 10/1972 | Kehr et al. | 525/440 |
| 3,897,400 A * | 7/1975 | Finelli | 528/64 |
| 3,926,919 A * | 12/1975 | Finelli | 528/288 |
| 4,146,688 A * | 3/1979 | Schwindt et al. | 521/159 |
| 4,254,229 A * | 3/1981 | Schwindt et al. | 521/163 |
| 4,301,270 A | 11/1981 | Chang | 528/64 |
| 4,349,656 A | 9/1982 | Arendt et al. | 528/63 |
| 4,672,100 A | 6/1987 | Schönbachler et al. | 528/75 |
| 4,742,125 A | 5/1988 | Schmidt et al. | 525/333.2 |
| 5,095,066 A * | 3/1992 | Meixner et al. | 524/500 |
| 5,691,425 A | 11/1997 | Klein et al. | 525/455 |
| 5,942,158 A * | 8/1999 | Okoroafor et al. | 252/586 |
| 6,001,424 A | 12/1999 | Lettmann et al. | 427/407.1 |
| 6,162,506 A | 12/2000 | Lettmann et al. | 427/407.1 |
| 6,372,875 B1 | 4/2002 | Mayer et al. | 528/60 |

FOREIGN PATENT DOCUMENTS

| | | |
|---|---|---|
| CA | 2 073 115 | 1/1993 |
| DE | 40 17 940 | 12/1991 |
| EP | 0 401 565 | 12/1990 |
| EP | 0 608 021 | 7/1994 |
| EP | 0 755 946 | 1/1997 |
| FR | 894 134 | 12/1944 |
| GB | 1 346 308 | 2/1974 |

OTHER PUBLICATIONS

Oertel; Polyurethane Handbook: Chemistry—Raw Materials—Processing—Application—Properties, 2nd Edition; Hanser Publishers; New York; 1994; pp. 25-27.*
Machine Translation of JP10158345 Filed May 11, 1997, entitled "Production of polyurethane hybrid dispersion, coated preparation, its production and coated material" from JPO.
English Language Abstract for DE 4017940.

* cited by examiner

*Primary Examiner*—Rabon Sergent

(57) ABSTRACT

Novel polyurethanes containing sulfide groups which comprise at least one group of the general formula I in the polymer main chain and/or at least one group of the general formula II incorporated at the chain end:

$$-X-A-S-B-Y- \qquad (I)$$

$$-X-A-S-B-YH \qquad (II)$$

in which the variables have the following definitions:
  S is the sulfur atom;
  X and Y independently of one another are oxygen atoms, sulfur atoms or groups —NZ where Z is the hydrogen atom or an alkyl radical of 1 to 10 carbon atoms; and
  A and B independently of one another are divalent organic radicals;

novel polymer mixtures based thereon, and the use of the novel polyurethanes and polymer mixtures and dispersions thereof for the preparation of coating materials, adhesives and sealing compounds.

4 Claims, No Drawings

POLYURETHANES CONTAINING SULPHIDE GROUPS, POLYMERIC MIXTURES BASED THEREON, PRODUCTION AND USE THEREOF

CROSS REFERENCE TO RELATED APPLICATIONS

This application is a National Phase Application of Patent Application PCT/EP01/12508 filed on 30 Oct. 2001, which claims priority to DE 100 53 890.8, filed on 31 Oct. 2000.

The present invention relates to novel polyurethanes containing sulfide groups and to novel polymer mixtures based thereon. The present invention further relates to the preparation of the novel polyurethanes containing sulfide groups and of the polymer mixtures based thereon. The present invention further relates to novel dispersions which comprise the novel polyurethanes containing sulfide groups and/or the novel polymer mixtures based thereon. The present invention additionally relates to the use of the novel polyurethanes containing sulfide groups, of the polymer mixtures based thereon, and of their dispersions to prepare novel coating materials, adhesives and sealing compounds. Furthermore, the present invention relates to the preparation of novel coatings, adhesives and seals on and in primed and unprimed substrates. Not least, the present invention relates to the primed and unprimed substrates coated with a novel coating, bonded with a novel adhesive film and/or sealed with a novel seal.

In the context of the present invention, polymer mixtures are understood as polymeric materials which result from the polymerization of olefinically unsaturated monomers in the presence of polyurethanes. They may comprise graft copolymers, containing very small amounts, if any, of polyurethanes and (co)polymers of the olefinically unsaturated monomers. Alternatively, the polymer mixtures may comprise the polyurethanes and the (co)polymers. Moreover, the mixtures may comprise graft copolymers, polyurethanes and (co)polymers of the olefinically unsaturated monomers.

Polymer mixtures based on polyurethane are known. They are normally prepared by polymerizing olefinically unsaturated monomers in the aqueous dispersion of a hydrophilic or hydrophobic polyurethane containing terminal and/or lateral, olefinically unsaturated groups in the polymer chain. Groups of this kind may be incorporated into the polyurethane chain by way of maleic acid or fumaric acid and/or esters thereof, by way of compounds containing two isocyanate-reactive groups and at least one olefinically unsaturated group, or by way of compounds containing two isocyanate groups and at least one olefinically unsaturated group, laterally to the polyurethane chain, by way of compounds containing one isocyanate-reactive group and at least one olefinically unsaturated group, or by way of compounds containing one isocyanate group and at least one olefinically unsaturated group, terminally to the polyurethane chain, or by way of anhydrides of alpha,beta-unsaturated carboxylic acids.

In this respect, reference is made by way of example to the patent applications and patents DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1 or EP 0 730 613 A1 and to the German patent applications DE 199 53 446.2, DE 199 53 445.2 or DE 199 53 203.6, unpublished at the priority date of the present specification.

In the context of the present invention, the property of being hydrophilic is understood as the constitutional property of a molecule or functional group to penetrate into the aqueous phase or to remain therein. Accordingly, in the context of the present invention, the property of being hydrophobic is understood as the constitutional property of a molecule or functional group to exhibit exophilic behavior with respect to water; i.e., such molecules or groups display the tendency not to penetrate into water, or to depart the aqueous phase. For further details, reference is made to Römpp Lexikon Lacke und Druckfarben, Georg Thieme Verlag, Stuttgart, N.Y., 1998, "Hydrophilicity", "Hydrophobicity", pages 294 and 295.

The known polymer mixtures based on polyurethane are used in particular to prepare aqueous basecoat materials. The known aqueous basecoat materials serve primarily to produce color and/or effect basecoats in multicoat systems by the wet-on-wet technique, as described, for example, in the patents and patent applications recited above.

However, the preparation of the known polymer mixtures based on polyurethane may present problems.

For instance, lateral and/or terminal allyl groups are frequently incorporated as grafting centers. The reactivity of the allyl groups, however, is comparatively low. If the more reactive acrylate or methacrylate groups are used instead of them, gelling of the polyurethanes may occur even before or during the graft copolymerization.

In many cases, not least, the amount of olefinically unsaturated groups in the polyurethanes may prove too low for complete grafting, so that a large proportion of the monomers intended for grafting on forms separate homopolymers and/or copolymers alongside the polyurethane, which may adversely affect the performance properties of the polymer mixtures and of the coating materials, adhesives and sealing compounds prepared using them. This disadvantage cannot be eliminated readily by increasing the double bond content of the polyurethanes for grafting, since to do so is to the detriment of other important performance properties of the polyurethanes.

Polyurethanes containing thiol groups, especially terminal thiol groups, are known.

The German patent application DE 40 17 940 A1 discloses alpha,omega-difunctional prepolymers which contain terminal thiol groups and which contain thiocarbamate groups in the chain. They are prepared by reacting dithiols with diisocyanates. They can be used to prepare linear polymers, networks, casting resins, composites, laminates, adhesives, coatings, coated materials, and as starting products for the preparation of thermoplastic materials of high molecular mass. However, no details of these end uses are given.

The German patent application DE 35 08 428 A1 discloses oligourethanes containing terminal thiol groups. They are prepared by reacting polyisocyanates with a substoichiometric amount of polyols and mercaptoalkanols. They are used as binders for oxidatively curable coating materials and sealing compounds, as additives for epoxy resins, or as crosslinking agents for plastics precursors or plastics comprising olefinically unsaturated compounds.

The German patent application DE 21 21 478 A1 discloses a process for crosslinking polymers containing thiol groups. Crosslinking agents used comprise nitrile N-oxides or precursors thereof such as poly(hydroxamoyl halides).

The German patent application DE 34 07 031 A1 discloses a process for preparing chemically curable or water-vulcanizable adhesives, coating materials, sealing compounds and casting compositions based on polyurethanes. In this process, prepolymers containing free isocyanate groups are reacted with prepolymers containing thiol groups, which are obtainable by reacting the prepolymers containing free isocyanate groups with mercaptoalkanols.

The German patent application DE 20 28 892 A1 discloses a curable composition comprising a constituent having two or more olefinically or acetylenically unsaturated bonds and a polythiol as crosslinking agent. The reaction between these constituents may be accelerated by means of alpha-hydroxy carboxylic acids.

It is an object of the present invention to provide novel polymer mixtures based on polyurethane which no longer have the disadvantages of the prior art but which instead can be prepared in high yields, simply and in a targeted manner, in the presence of readily available hydrophilic and hydrophobic polyurethanes, and which have very good performance properties irrespective of whether they contain large or small amounts of homopolymers and/or copolymers. The novel polymer mixtures based on polyurethane should be suitable for the preparation of aqueous coating materials, adhesives and sealing compounds which on and/or in primed and unprimed substrates provide coatings, adhesive films and seals whose profile of properties is at least equal if not superior to that of existing coatings, adhesive films and seals.

Accordingly, we have found the novel polyurethane containing sulfide groups which comprises at least one group of the general formula I in the polymer main chain and/or at least one group of the general formula II incorporated at the chain end:

—X—A—S—B—Y— (I)

—X—A—S—B—YH (II)

in which the variables have the following definitions:
S is the sulfur atom;
X and Y independently of one another are oxygen atoms, sulfur atoms or groups —NZ where Z is the hydrogen atom or an alkyl radical of 1 to 10 carbon atoms; and
A and B independently of one another are divalent organic radicals.

In the text below, the novel polyurethane containing sulfide groups is referred to as the "polyurethane of the invention".

We have also found the novel polymer mixture based on the polyurethane of the invention, which is preparable by polymerizing at least one olefinically unsaturated monomer in a solution or aqueous dispersion of at least one hydrophobic or hydrophilic polyurethane of the invention.

In the text below, the novel polymer mixture is referred to as the "polymer mixture of the invention".

Furthermore, we have found the novel process for preparing the polyurethane of the invention, in which at least one compound of the general formula III is incorporated into the polymer main chain and/or at the chain end:

HX—A—S—B—YH (III)

in which the variables have the following definitions:
S is the sulfur atom;
H is hydrogen atoms;
X and Y independently of one another are oxygen atoms, sulfur atoms or groups —NZ where Z is the hydrogen atom or an alkyl radical of 1 to 10 carbon atoms; and
A and B independently of one another are divalent organic radicals.

Moreover, we have found the novel process for preparing a polymer mixture by polymerizing at least one olefinically unsaturated monomer in the presence of at least one hydrophilic or hydrophobic polyurethane of the invention.

Additionally, we have found the novel aqueous dispersions of the polyurethane of the invention and of the polymer mixture of the invention.

Furthermore, we have found the novel coating materials, adhesives and sealing compounds based on the polyurethane of the invention, on the polymer mixture of the invention and/or on their dispersions.

Furthermore, we have found the novel coatings, adhesive films and seals on and/or in primed and unprimed substrates, which are referred to below as the "coatings, adhesive films and seals of the invention".

F Further subject matters of the invention will emerge from the description.

In the light of the prior art it was surprising that the complex object on which the present invention is based could be elegantly achieved with the aid of the polyurethanes of the invention and of the polymer mixtures of the invention. Even more surprising was that no special new apparatus or procedural measures were necessary either for the process for preparing the polyurethanes of the invention or for the process for preparing the polymer mixtures of the invention, but that instead it was possible to employ the apparatus and procedural measures known from the prior art. In this context it should be emphasized that said processes of the invention are not accompanied by the procedural and safety problems associated with the use of olefinically unsaturated polyurethanes, such as the gelling of the mixture, for instance. A further surprise was the extremely broad applicability of the polyurethanes, polymer mixtures and dispersions of the invention.

The preparation of the polymer mixture of the invention starts from at least one, preferably one, hydrophilic or hydrophobic polyurethane of the invention.

The polyurethane of the invention contains at least one group of the general formula I in the polymer main chain and/or at least one group of the general formula II incorporated at the chain end:

—X—A—S—B—Y— (I)

—X—A—S—B—YH (II)

in which the variables have the following definitions:
S is the sulfur atom;
X and Y independently of one another are oxygen atoms, sulfur atoms or groups —NZ where Z is the hydrogen atom or an alkyl radical of 1 to 10 carbon atoms; and
A and B independently of one another are divalent organic radicals.

Examples of suitable alkyl radicals Z are methyl, ethyl, propyl, butyl, pentyl, hexyl, heptyl, octyl, nonyl or decyl.

The divalent organic radicals A and B may be identical to or different from one another. Suitable radicals A and B are all divalent organic radicals which are not isocyanate-reactive.

Examples of suitable divalent organic radicals are substituted or unsubstituted aliphatic, cycloaliphatic, aromatic, aliphatic-cycloaliphatic, aliphati-caromatic and/or cycloaliphatic-aromatic divalent radicals which may contain heteroatoms but which must not be isocyanate-reactive.

Suitable substituents are electron-withdrawing or electron-donating atoms or organic radicals which are not isocyanate-reactive.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals, especially phenoxy, naphthoxy, methoxy, ethoxy, propoxy, butyloxy or cyclohexyloxy.

In accordance with the invention, the unsubstituted divalent organic radicals A and B which contain no heteroatoms are of advantage and are therefore used with preference in accordance with the invention.

Especially suitable divalent aliphatic radicals A and B are derived from aliphatic hydrocarbons such as methane, ethane, propane, butane, pentane, hexane, heptane, octane, nonane or decane.

Especially suitable divalent cycloaliphatic radicals A and B are derived from cycloaliphatic hydrocarbons such as cyclobutane, cyclopentane, cyclohexane, norbornene or decalin.

Especially suitable divalent aromatic radicals A and B are derived from aromatic hydrocarbons such as benzene, naphthalene or biphenyl.

Especially suitable aliphatic-cycloaliphatic divalent radicals A and B are derived from aliphatic-cycloaliphatic hydrocarbons such as ethylcyclopentane or methylcyclohexane.

Especially suitable aliphatic-aromatic divalent radicals A and B are derived from aliphatic-aromatic hydrocarbons such as toluene or xylene.

Especially suitable cycloaliphatic-aromatic divalent radicals A and B are derived from cycloaliphatic-aromatic hydrocarbons such as cyclohexylbenzene or cyclohexylbiphenyl.

Very special suitability is possessed by the divalent aliphatic radicals A and B, especially the ethane-1,2-diyl radical (dimethylene radical).

Accordingly, the group of the general formula I used with very particular preference is the 1,7-dioxa-4-thiaheptane-1,7-diyl group and the group of the general formula II used with very particular preference is the 1,7-dioxa-4-thiaheptan-1-yl group.

The polyurethanes of the invention preferably contain at least one, in particular at least two, chain-positioned groups of the general formula I. In addition, they may also contain at least one, in particular at least two, terminal groups of the general formula II. The amount of groups of the general formula I or of groups of the general formula I and II may be set for the polyurethanes of the invention by way of the stoichiometric proportions of the starting compounds, which are described below.

The polyurethanes of the invention are of linear, star-branched or comblike construction, but especially linear. Apart from the groups of the general formula I and/or of the general formula II which are essential to the invention, they may contain further functional groups.

For instance, both the hydrophilic and the hydrophobic polyurethanes of the invention may contain reactive functional groups by means of which the resultant polymer mixtures of the invention become thermally self-crosslinking or externally crosslinking. A prerequisite, however, is that these reactive functional groups do not disrupt or inhibit the graft copolymerization.

The hydrophilic polyurethanes generally contain alternatively (f1) functional groups which can be converted into cations by neutralizing agents and/or quaternizing agents, or (f2) functional groups which can be converted into anions by neutralizing agents, and/or anionic groups, and/or (f3) nonionic hydrophilic groups, especially poly-(alkylene ether) groups, which promote the dispersibility of the polyurethanes and of the polymer mixtures of the invention in water.

Examples of suitable functional groups (f1) for use in accordance with the invention, which can be converted into cations by neutralizing agents and/or quaternizing agents, are primary, secondary or tertiary amino groups, secondary sulfide groups or tertiary phosphine groups, especially tertiary amino groups or secondary sulfide groups.

Examples of suitable cationic groups (f1) to be used in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups (f2) for use in accordance with the invention, which can be converted into anions by neutralizing agents, are carboxylic acid, sulfonic acid or phosphonic acid groups, especially carboxylic acid groups.

Examples of suitable anionic groups (f2) for use in accordance with the invention are carboxylate, sulfonate or phosphonate groups, especially carboxylate groups.

Examples of suitable neutralizing agents for functional groups (f1) convertible into cations are organic and inorganic acids such as sulfuric acid, hydrochloric acid, phosphoric acid, formic acid, acetic acid, lactic acid, dimethylolpropionic acid or citric acid.

Examples of suitable neutralizing agents for functional groups (f2) convertible into anions are ammonia or amines, such as trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine or triethanolamine, for example. Preferred neutralizing agents used are dimethylethanolamine and/or triethylamine.

Advantageously, depending on the type of stabilization, the polyurethane of the invention has an acid number or amine number of from 10 to 250 mg KOH/g (ionic stabilization or nonionic plus ionic stabilization) or from 0 to 10 mg KOH/g (nonionic stabilization), an OH number of from 30 to 350 mg KOH/g and a number average molecular weight of from 1500 to 55,000 daltons.

The polyurethanes of the invention may be prepared by any desired, customary and known methods of polyurethane chemistry. In accordance with the invention, however, it is of advantage to prepare them by the reaction of an isocyanato-containing polyurethane prepolymer with at least one compound of the general formula III

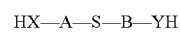　　　　　　(III).

In the general formula III, the variables have the definitions stated above for the general formula I and II. Examples of highly suitable compounds of the general formula III are, accordingly, thiodiethanol, thiodicyclohexan-4-ol or thiodiphenol, but especially thiodiethanol.

The isocyanato-containing polyurethane prepolymers comprise linear, star-branched or comblike polymers or oligomers. It is preferred to use linear polyurethane prepolymers.

In the context of the present invention, here and below, oligomers are resins which contain at least 2 to 15 monomer units in their molecule. In the context of the present invention, polymers are resins which contain at least 10 monomer units in their molecule. For further details of these terms, reference is made to Römpp Lexikon Lacke und Druckfarben, Georg Thieme Verlag, Stuttgart, N.Y., 1998, "Oligomers", page 425.

The reaction of the isocyanato-containing polyurethane prepolymers with the compounds of the general formula III has no special features in terms of its method but instead takes place in accordance with the customary and known methods of the chemistry of organic polyisocyanates, as are described, for example, in the German patent applications DE 34 07 031 A1 or DE 40 17 940 A1. Normally, the reaction is continued until free isocyanate groups are no longer detectable.

Viewed in terms of this method, the preparation of the isocyanato-containing polyurethane prepolymers has no special features but instead takes place, for example, as described in the patents EP 0 089 497 B1 or EP 0 228 003 B1, by reaction of at least one polyisocyanate, especially a diisocyanate, with at least one polyol, especially a diol, the isocyanate component being employed in a molar excess, so as to give terminal free isocyanate groups.

The preparation of the isocyanato-containing polyurethane prepolymers is preferably carried out using diisocyanates and, if desired, minor amounts of polyisocyanates for the purpose of introducing branching. In the context of the present invention, minor amounts are amounts which do not bring about gelling of the polyurethane prepolymers in the course of their preparation. Such gelling may also be prevented by using small amounts of monoisocyanates.

Examples of suitable diisocyanates are isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, trimethylene diisocyanate, tetramethylene diisocyanate, pentamethylene diisocyanate, hexamethylene diisocyanate, ethylethylene diisocyanate, trimethylhexane diisocyanate, heptanemethylene diisocyanate or diisocyanates derived from dimeric fatty acids, as marketed under the commercial designation DDI 1410 by the company Henkel and described in the patents DO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane, 1,2-, 1,4- or 1,3-bis(4-isocyanatobut-1-yl)cyclohexane, liquid bis(4-isocyanatocyclohexyl)methane with a trans/trans content of up to 30% by weight, preferably 25% by weight, and in particular 20% by weight, as is described in the patents DE 44 14 032 A1, GB 1 220 717 A1, DE-A-16 18 795 or DE 17 93 785 A1; tolylene diisocyanate, xylylene diisocyanate, bisphenylene diisocyanate, naphthylene diisocyanate or diphenylmethane diisocyanate.

Examples of suitable polyisocyanates are the isocyanurates of the diisocyanates described above.

Examples of highly suitable monoisocyanates are phenyl isocyanate, cyclohexyl isocyanate, stearyl isocyanate, vinyl isocyanate, methacryloyl isocyanate and/or 1-(1-isocyanato-1-methylethyl)-3-(1-methylethenyl)benzene (TMI® from CYTEC).

Examples of suitable polyols are saturated or olefinically unsaturated polyester polyols which are prepared by reacting
  unsulfonated or sulfonated saturated and/or unsaturated polycarboxylic acids or their esterifiable derivatives, alone or together with monocarboxylic acids, and
  saturated and/or unsaturated polyols, alone or together with monools.

Examples of suitable polycarboxylic acids are aromatic, aliphatic and cycloaliphatic polycarboxylic acids. Preference is given to the use of aromatic and/or aliphatic polycarboxylic acids.

Examples of suitable aromatic polycarboxylic acids are phthalic acid, isophthalic acid, terephthalic acid, phthalic, isophthalic or terephthalic acid monosulfonate, or halophthalic acids, such as tetrachlorophthalic or tetrabromophthalic acid, among which isophthalic acid is advantageous and is therefore used with preference.

Examples of suitable acyclic aliphatic or unsaturated polycarboxylic acids are oxalic acid, malonic acid, succinic acid, glutaric acid, adipic acid, pimelic acid, suberic acid, azelaic acid, sebacic acid, undecanedicarboxylic acid or dodecanedicarboxylic acid, or maleic acid, fumaric acid or itaconic acid, of which adipic acid, glutaric acid, azelaic acid, sebacic acid, dimeric fatty acids and maleic acid are advantageous and are therefore used with preference.

Examples of suitable cycloaliphatic and cyclic unsaturated polycarboxylic acids are 1,2-cyclobutanedicarboxylic acid, 1,3-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 1,4-cyclohexanedicarboxylic acid, 4-methylhexahydrophthalic acid, tricyclodecanedicarboxylic acid, tetrahydrophthalic acid or 4-methyltetrahydrophthalic acid. These dicarboxylic acids may be used both in their cis and in their trans form and also as a mixture of both forms.

Further examples of suitable polycarboxylic acids are polymeric fatty acids, especially those having a dimer content of more than 90% by weight, which are also known as dimeric fatty acids.

Also suitable are the esterifiable derivatives of the abovementioned polycarboxylic acids, such as their monoesters or polyesters with aliphatic alcohols having 1 to 4 carbon atoms, for example. It is also possible to use the anhydrides of the abovementioned polycarboxylic acids, where they exist.

Together with the polycarboxylic acids it is also possible if desired to use monocarboxylic acids, such as, for example, benzoic acid, tert-butylbenzoic acid, lauric acid, isononanoic acid, fatty acids of naturally occurring oils, acrylic acid, methacrylic acid, ethacrylic acid or crotonic acid. The preferred monocarboxylic acid used is isononanoic acid.

Examples of suitable polyols are diols and triols, especially diols. Normally, triols are used alongside the diols in minor amounts in order to introduce branches into the polyester polyols. In the context of the present invention, minor amounts are amounts which do not cause gelling of the polyester polyols during their preparation.

Examples of suitable diols are ethylene glycol, 1,2- or 1,3-propanediol, 1,2-, 1,3- or 1,4-butanediol, 1,2-, 1,3-, 1,4- or 1,5-pentanediol, 1,2-, 1,3-, 1,4-, 1,5- or 1,6-hexanediol, neopentyl hydroxypivalate, neopentyl glycol, diethylene glycol, 1,2-, 1,3- or 1,4-cyclohexanediol, 1,2-, 1,3- or 1,4-cyclohexanedimethanol, trimethylpentanediol, ethylbutylpropanediol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene and 1,3-bis(2'-hydroxypropyl) benzene.

Of these diols, 1,6-hexanediol and neopentyl glycol are particularly advantageous and are therefore used with particular preference.

The abovementioned diols may also be used as diols directly to prepare the polyurethane prepolymers.

Examples of suitable triols are trimethylolethane, trimethylolpropane or glycerol, especially trimethylolpropane.

The abovementioned triols may also be used as triols directly to prepare the polyurethane prepolymers (cf. EP 0 339 433 A1).

If desired, minor amounts of monools may also be used. Examples of suitable monools are alcohols or phenols such as ethanol, propanol, n-butanol, sec-butanol, tert-butanol, amyl alcohols, hexanols, fatty alcohols, allyl alcohol, or phenol.

The polyester polyols may be prepared in the presence of small amounts of a suitable solvent as entrainer. Examples of entrainers used are aromatic hydrocarbons, such as especially xylene and (cyclo)-aliphatic hydrocarbons, e.g., cyclohexane or methylcyclohexane.

Further examples of suitable polyols are polyester diols which are obtained by reacting a lactone with a diol. They are notable for the presence of terminal hydroxyl groups and repeating polyester fractions of the formula —(—CO—(CHR)$_m$—CH$_2$—O—)—. Here, the index m is preferably from 4 to 6 and the substituent R is hydrogen or an alkyl, cycloalkyl, or alkoxy radical. No substituent contains more than 12 carbon atoms. The total number of carbon atoms in the substituent does not exceed 12 per lactone ring. Examples are hydroxycaproic acid, hydroxybutyric acid, hydroxydecanoic acid, and/or hydroxystearic acid.

Preferred for the preparation of the polyester diols is the unsubstituted epsilon-caprolactone, where m is 4 and all substituents R are hydrogen. The reaction with lactone is started by low molecular mass polyols such as ethylene glycol, 1,3-propanediol, 1,4-butanediol, or dimethylolcyclohexane. It is also possible, however, to react other reaction components, such as ethylenediamine, alkyldialkanolamines, or else urea, with caprolactone. Other suitable diols of relatively high molecular mass are polylactam diols, which are prepared by reacting, for example, epsilon-caprolactam with low molecular mass diols.

Further examples of suitable polyols include polyether polyols, especially those having a number-average molecular weight of from 400 to 5000, in particular from 400 to 3000. Examples of highly suitable polyether diols are polyether diols of the general formula H—(—O—(CHR$^1$)$_o$—)$_p$OH, where the substituent R$^1$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether diols such as poly(oxyethylene) glycols, poly(oxypropylene) glycols, and poly(oxybutylene) glycols.

By means of the polyether diols it is possible to introduce the nonionic hydrophilic functional groups (f3), or a part thereof, into the main chain(s) of the polyurethane prepolymers.

For the preparation of the polyurethane prepolymers it is also possible to use further starting compounds in order to vary advantageously the profile of properties of the polyurethanes of the invention and of the polymer mixtures of the invention.

Where the polyurethanes and polymer mixtures of the invention are to have self-crosslinking properties, it is possible to use at least one compound containing at least one blocked isocyanate group and at least two isocyanate-reactive functional groups. Examples of suitable isocyanate-reactive groups are —SH, —NH$_2$, >NH, —OH, —O—(CO)—NH—(CO)—NH$_2$ or —O—(CO)—NH$_2$, of which the primary and secondary amino groups and the hydroxyl group are of advantage and the hydroxyl groups are of particular advantage. Examples of suitable blocking agents are the blocking agents known from the U.S. Pat. No. 4,444,954 A1, of which the oximes and ketoximes xiii), especially the ketoximes xiii), specifically methyl ethyl ketoxime, offer particular advantages and are therefore used with particular preference. However, the blocked isocyanate groups may also result from the reaction of the free isocyanate groups of the polyurethane prepolymer with the blocking agents.

For introducing olefinically unsaturated groups—where used—it is possible to use at least one compound containing at least one olefinically unsaturated group and at least two isocyanate-reactive functional groups. Examples of suitable isocyanate-reactive functional groups are those described above. Examples of suitable olefinically unsaturated groups and compounds for introducing them are described in the patent applications and patents DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1 or EP 0 730 613 A1 and also in the German patent applications DE 199 53 446.2, DE 199 53 445.2 or DE 199 53 203.6, unpublished at the priory date of this present specification. Alternatively, the olefinically unsaturated groups may be introduced by way of the above-described compounds containing at least one olefinically unsaturated group and an isocyanate group.

For the preparation of the hydrophilic polyurethanes of the invention, compounds containing at least one hydrophilic functional group and at least one isocyanate-reactive functional group are additionally incorporated into the isocyanato-containing polyurethane prepolymers.

The introduction of hydrophilic functional (potentially) cationic groups (f1) into the polyurethane prepolymers takes place by way of the incorporation of compounds which contain in the molecule at least one, especially two, isocyanate-reactive groups and at least one group capable of forming cations; the amount to be used may be calculated from the target amine number.

Suitable isocyanate-reactive groups are those described above, especially hydroxyl groups and also primary and/or secondary amino groups, of which the hydroxyl groups are used with preference.

Examples of suitable compounds of this kind are 2,2-dimethylolethyl- or -propylamine blocked with a ketone, the resultant ketoxime group being hydrolyzed again prior to the format-ion of the cationic group (f1), or N,N-dimethyl-, N,N-diethyl- or N-methyl-N-ethyl-2,2-dimethylolethyl- or -propylamine.

The introduction of hydrophilic functional (potentially) anionic groups (f2) into the polyurethane prepolymers takes place by way of the incorporation of compounds which contain in the molecule at least one isocyanate-reactive group and at least one group capable of forming anions; the amount to be used may be calculated from the target acid number.

Examples of suitable compounds of this kind are those containing two isocyanate-reactive groups in the molecule. Here again, suitable isocyanate-reactive groups are those described above. Accordingly it is possible, for example, to use alkanoic acids having two substituents on the α carbon atom. The substituent may be a hydroxyl group, an alkyl group, or, preferably, an alkylol group. These alkanoic acids have at least one, generally from 1 to 3, carboxyl groups in the molecule. They have 2 to about 25, preferably 3 to 10, carbon atoms. Examples of suitable alkanoic acids are dihydroxypropionic acid, dihydroxysuccinic acid, and dihydroxybenzoic acid. A particularly preferred group of alkanoic acids are the alpha, alpha-dimethylolalkanoic acids of the general formula $R^2$—C(CH$_2$OH)$_2$COOH, $R^2$ being a hydrogen atom or an alkyl group having up to about 20 carbon atoms. Examples of especially suitable alkanoic acids are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of compounds containing amino groups are α, δ-diaminovaleric acid, 3,4-diaminobenzoic acid, 2,4-diaminotoluenesulfonic acid, and 2,4-diaminodiphenyl ether sulfonic acid.

Hydrophilic functional nonionic poly(oxyalkylene) groups (f3) may be introduced as lateral or terminal groups into the polyurethane molecules. For this purpose it is possible to use not only the above-described polyether diols but also, for example, alkoxypoly(oxyalkylene) alcohols having the general formula $R^3O$—(—CH$_2$—CHR$^4$—O—)$_r$H, where $R^3$ is an alkyl radical having 1 to 6 carbon atoms, $R^4$ is a hydrogen atom or an alkyl radical having 1 to 6 carbon atoms, and the index r is a number between 20 and 75 (cf. the patent applications EP 0 354 261 A1 or EP 0 424 705 A2).

The hydrophilic functional groups (f1) or (f2) are to be selected so as to rule out the possibility of any disruptive reactions, such as, for instance, salt formation or crosslinking with the functional groups that may be present in the other starting compounds and/or constituents of the polyurethanes of the invention or of polymer mixtures of the invention, of the dispersions of the invention, of the coating materials of the invention, of the sealing compounds of the invention, or of the adhesives of the invention. The skilled worker will therefore be able to make the selection in a simple manner on the basis of his or her knowledge in the art.

Of these hydrophilic functional (potentially) ionic groups (f1) and (f2) and the hydrophilic functional nonionic groups (f3), the (potentially) anionic groups (f2) are advantageous and are therefore used with particular preference.

The preparation of the isocyanato-containing polyurethane prepolymers from the starting compounds described above likewise has no special features in terms of method but instead takes place in bulk or in an inert organic medium, preferably in an inert organic medium, in which case use is made preferably of polar organic solvents, especially water miscible solvents such as ketones, esters, ethers, cyclic amides or sulfoxides. The reaction in this case may take place in two or more stages or in one stage. The essential factor is that the reaction is carried out until the amount of free isocyanate groups is constant.

The polyurethanes of the invention may be isolated from the solutions or dispersions in which they are produced and put to a very wide variety of end uses, especially in solvent-containing, water- and solvent-free pulverulent solid or water- and solvent-free liquid coating materials, adhesives and sealing compounds. Thus, they are suitable for preparing pigmented or unpigmented, conventional or aqueous coating materials, powder coating materials, powder slurry coating materials, or 100% systems. In particular, however, they serve to prepare the polymer mixtures of the invention.

For this purpose, at least one olefinically unsaturated monomer (a) is polymerized in the presence of at least one polyurethane of the invention in organic solution or in a dispersion.

Conducting the polymerization in organic solution has the advantage that this process step can be carried out directly after the preparation of the polyurethane of the invention, in other words without a dispersing step in between. In certain circumstances, this facilitates the isolation of the polymer mixtures of the invention for particular end uses. In this case, the customary and known methods of solution polymerization may be employed.

In accordance with the invention, it is of advantage to polymerize the monomer (a) or the monomers (a) in the dispersion of at least one polyurethane of the invention in an aqueous medium, especially when the resulting polymer mixtures of the invention are used to prepare aqueous coating materials, adhesives and sealing compounds.

The aqueous medium contains essentially water. The aqueous medium may include minor amounts of organic solvents, neutralizing agents, crosslinking agents and/or customary coatings additives and/or other dissolved solid, liquid or gaseous organic and/or inorganic substances of low and/or high molecular mass. In the context of the present invention, the term "minor amount" means an amount which does not change the aqueous nature of the aqueous medium. The aqueous medium, however, may also comprise just water.

For the purpose of dispersion, the hydrophilic polyurethanes of the invention, containing the above-described (potentially) ionic hydrophilic functional groups (f1) or (f2), are neutralized with at least one of the above-described neutralizing agents and subsequently are dispersed. In the case of the hydrophilic thio polyurethanes of the invention which contain only the nonionic hydrophilic functional groups (f3), the use of neutralizing agents is unnecessary.

It is also possible to disperse the hydrophobic polyurethanes of the invention in an aqueous medium. Advantageously, this is carried out in a strong shear field. Viewed in terms of its method, this process has no special features, but instead may take place, for example, in accordance with the microfluidizer dispersion techniques described in the European patent application EP 0 401 565 A1.

Examples of monomers (a) suitable for preparing the polymer mixtures of the invention are the following:

Monomers (a1):

Hydroxyalkyl esters of acrylic acid, methacrylic acid or another alpha,beta-ethylenically unsaturated carboxylic acid which are derived from an alkylene glycol which is esterified with the acid, or are obtainable by reacting the acid with alkylene oxide, especially hydroxyalkyl esters of acrylic acid, methacrylic acid, crotonic acid or ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate or crotonate; 1,4-bis(hydroxymethyl)cyclohexane, octahydro-4,7-methano-1H-indenedimethanol or methylpropanediol monoacrylate, monomethacrylate, monoethacrylate or monocrotonate; or reaction products of cyclic esters, such as ε-caprolactone, for example, and these hydroxyalkyl esters; or olefinically unsaturated alcohols such as allyl alcohol or polyols such as trimethylolpropane monoallyl or diallyl ether or pentaerythritol monoallyl, diallyl or triallyl ether. These higher-functional monomers (a1) are generally used only in minor amounts. In the context of the present invention, minor amounts of higher-functional monomers here are amounts which do not result in crosslinking or gelling of the polyacrylate resins unless the polymer mixtures of the invention are to be in the form of crosslinked microgel particles.

Monomers (a2):

(Meth)acrylic, crotonic or ethacrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate, methacrylate, crotonate or ethacrylate; cycloaliphatic (meth)acrylic, crotonic or ethacrylic esters, especially cyclohexyl, isobornyl, dicyclopentadienyl, octahydro-4,7-methano-1H-indenemethanol or tert-butylcyclohexyl (meth)acrylate, crotonate or ethacrylate; (meth)acrylic, crotonic or ethacrylate oxaalkyl esters or oxacycloalkyl esters such as ethyltriglycol (meth)acrylate and methoxyoligoglycol (meth)acrylate having a molecular weight Mn of preferably 550; or other ethoxylated and/or propoxylated hydroxyl-free (meth) acrylic acid, crotonic acid or ethacrylic acid derivatives. These may include, in minor amounts, higher-functional (meth)acrylic, crotonic or ethacrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri-(meth)acrylate; or pentaerythritol di-, tri- or tetra(meth)acrylate and the analogous ethacrylates or crotonates. In the context of the present invention, minor amounts of higher-functional monomers (a2) here are amounts which do not result in crosslinking or gelling of the polyacrylate resins unless the polymer mixtures of the invention are to be in the form of crosslinked microgel particles.

Monomers (a3):

Ethylenically unsaturated monomers which carry at least one acid group, preferably a carboxyl group, per molecule, or a mixture of such monomers. As components (a3) it is particularly preferred to use acrylic acid and/or methacrylic acid. It is also possible, however, to use other ethylenically unsaturated carboxylic acids having up to 6 carbon atoms in the molecule. Examples of such acids are ethacrylic acid, crotonic acid, maleic acid, fumaric acid, and itaconic acid. It is also possible to use ethylenically unsaturated sulfonic or phosphonic acids, and/or their partial esters, as component (a3). Further suitable monomers (a3) include mono(meth)acryloyloxyethyl maleate, succinate, and phthalate, and also vinylbenzoic acid (all isomers); alpha-methylvinylbenzoic acid (all isomers) or vinylbenzenesulfonic acid (all isomers).

Monomers (a4):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products from paraffinic hydrocarbons, such as mineral oil fractions, and may contain both branched and straight-chain acyclic and/or cycloaliphatic olefins. In the reaction of such olefins with formic acid and/or with carbon monoxide and water, a mixture of carboxylic acids is formed in which the car-boxyl groups are located predominantly on a quaternary carbon atom. Other olefinic starting materials are, for example, propylene trimer, propylene tetramer, and diisobutylene. Alternatively, the vinyl esters may be prepared in a conventional manner from the acids, for example, by reacting the acid with acetylene. Particular preference—owing to their ready availability—is given to the use of vinyl esters of saturated aliphatic mono-carboxylic acids having 9 to 11 carbon atoms and being branched on the alpha carbon atom.

Monomers (a5):

Reaction product of acrylic acid and/or methacrylic acid with the glycidyl ester of an alpha-branched monocarboxylic acid having 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic® acid. This glycidyl ester is obtainable commercially under the name Cardura® E10. For further details, reference is made to Römpp Lexikon Lacke und Druckfarben, Georg Thieme Verlag, Stuttgart, N.Y., 1998, pages 605 and 606.

Monomers (a6):

Ethylenically unsaturated monomers essentially free from acid groups, such as olefins such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,N-dimethyl-, N-ethyl-, N,N-diethyl-, N-propyl-, N,N-dipropyl, N-butyl-, N,N-dibutyl-, N-cyclohexyl- and/or N,N-cyclohexyl-methyl-(meth)acrylamide and/or N-methylol-, N,N-dimethylol-, N-methoxymethyl-, N,N-di(methoxymethyl)-, N-ethoxymethyl- and/or N,N-di(ethoxyethyl)-(meth)acrylamide, which are used in particular when the polymer mixtures of the invention are to have self-crosslinking properties;

monomers containing epoxide groups, such as the glycidyl ester of acrylic acid, methacrylic acid, ethacrylic acid, crotonic acid, maleic acid, fumaric acid and/or itaconic acid;

aminoethyl acrylate, aminoethyl methacrylate, allylamine or N-methyliminoethyl acrylate;

N,N-di(methoxymethyl)aminoethyl acrylate or methacrylate or N,N-di(butoxymethyl)aminopropyl acrylate or methacrylate;

acryloyloxy- or methacryloyloxy-ethyl-, -propyl- or -butylcarbamate or -allophanate; further examples of suitable monomers containing carbamate groups are described in the patents U.S. Pat. No. 3,479,328 A1, U.S. Pat. No. 3,674,838 A1, U.S. Pat. No. 4,126,747 A1, U.S. Pat. No. 4,279,833 A1 or U.S. Pat. No. 4,340,497 A1;

vinylaromatic hydrocarbons, such as styrene, alpha-alkylstyrenes, especially alpha-methylstyrene, arylstyrenes, especially diphenylethylene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are marketed under the brand name VeoVa® by the company Deutsche Shell Chemie (for further details, reference is made to, Römpp Lexikon Lacke und Druckfarben, Georg Thieme Verlag, Stuttgart, N.Y., 1998, page 598 and also pages 605 and 606), and/or the vinyl ester of 2-methyl-2-ethylheptanoic acid; and/or polysiloxane macromonomers having a number-average molecular weight Mn of from 1000 to 40,000, preferably from 2000 to 20,000, with particular preference from 2500 to 10,000, and in particular from 3000 to 7000, and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1, or in the international patent application WO 92/22615 on page 12, line 18 to page 18, line 10, or acryloxysilane-containing vinyl monomers, preparable by reacting hydroxy-functional silanes with epichlorohydrin and then reacting the reaction product with methacrylic acid and/or hydroxyalkyl esters of (meth)acrylic acid.

From these suitable monomers (a) described above by way of example, the skilled worker is easily able to select, on the basis of their known physicochemical properties and reactivities, the monomers (a) that are particularly suitable for the intended use in question. For example, he or she may select monomers (a1), (a3) and/or (a6) which introduce reactive functional groups which are necessary for thermal crosslinking. If desired, he or she may for this purpose conduct a few preliminary range-finding experiments. In particular, he or she will be careful to ensure that monomers (a) contain no functional groups, especially (potentially) ionic functional groups, which enter into unwanted interactions and/or chemical reactions with the (potentially) ionic functional groups in the hydrophilic polyurethanes of the invention.

Where the polymer mixtures of the invention are present in the form of crosslinked microgel particles or comprise such particles, higher-functional monomers (a), especially the above-described higher-functional monomers (a1) and/or (a2), are used in amounts which lead to targeted crosslinking of the grafted and/or ungrafted (co)polymers.

In accordance with the invention, particular advantages result if the monomers (a) are selected such that the profile of properties of the grafted (co)polymers is determined essentially by the above-described (meth)acrylate monomers (a), the other monomers (a) advantageously providing broad variation of this profile of properties.

In accordance with the invention, very particular advantages result from using mixtures of the monomers (a1), (a2) and (a6) and also, if desired, (a3).

Viewed in terms of method, the preparation of the polymer mixtures of the invention has no special features but instead takes place in accordance with the customary and known methods of free-radical solution or emulsion, miniemulsion or microemulsion polymerization in the presence of at least one polymerization initiator such as is described, for example, in the patents and patent applications DE 197 22 862 C2, DE 196 45 761 A1, EP 0 401 565 A1, EP 0 522 420 A1, EP 0 522 419 A2, EP 0 755 946 A1, EP 0 608 021 A1, EP 0 708 788 A1 or EP 0 730 613 A1, and in the German patent applications DE 199 53 446.2, DE 199 53 445.2 or DE 199 53 203.6, unpublished at the priority date of the present specification.

In the case of the emulsion polymerization, the monomers (a) may also be brought into the form of a preemulsion with the aid of a portion of a polyurethane dispersion of the invention and water, this preemulsion then being metered slowly into an initial charge in which the actual emulsion polymerization takes place.

Examples of suitable polymerization initiators are initiators which form free radicals, such as dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate, or tert-butyl per-2-ethylhexanoate; potassium, sodium or ammonium peroxodisulfate; azo dinitriles such as azobisiso-butyronitrile; C—C-cleaving initiators such as benzpinacol silyl ether; or a combination of a nonoxidizing initiator with hydrogen peroxide. Preference is given to the use of water-insoluble initiators. The initiators are used preferably in an amount of from 0.1 to 25% by weight, with particular preference from 0.75 to 10% by weight, based on the overall weight of the monomers (a).

In the solutions or the aqueous emulsions, the monomers (a) are then polymerized with the aid of the abovementioned radical-forming initiators at temperatures from 0 to 95° C., preferably from 40 to 95° C., and when using redox systems at temperatures from 30 to 70° C. When operating under superatmospheric pressure, the emulsion polymerization may also be conducted at temperatures above 100° C. The same applies to solution polymerization if relatively high-boiling organic solvents and/or superatmospheric pressure are/is employed.

It is preferred to commence the initiator feed a certain time, generally from about 1 to 15 minutes, before the feed of the monomers. Preference is also given to a process wherein the addition of initiator is commenced at the same point in time as the addition of the monomers and is ended about half an hour after the addition of the monomers has been ended. The initiator is preferably added in a constant amount per unit time. Following the end of addition of initiator, the reaction mixture is held at polymerization temperature until (generally 1 to 1.5 hours) all of the monomers used have undergone essentially complete reaction. "Essentially complete reaction" is intended to denote that preferably 100% by weight of the monomers used have been converted but that it is also possible for a low residual monomer content of not more than up to about 0.5% by weight, based on the weight of the reaction mixture, to remain unconverted.

Suitable reactors for the (co)polymerization processes are the customary and known stirred vessels, cascades of stirred vessels, tube reactors, loop reactors or Taylor reactors, as described, for example, in the patent DE 1 071 241 B1, the patent applications EP 0 498 583 A1 or DE 198 28 742 A1, or in the article by K. Kataoka in Chemical Engineering Science, Volume 50, No. 9, 1995, pages 1409 to 1416.

In accordance with the invention it is of advantage to select the polyurethanes of the invention and the monomers (a) such that the grafted-on (co)polymer and/or the grafted hydrophilic polyurethane of the invention, but especially the grafted hydrophilic polyurethane of the invention, contain/contains hydrophilic functional groups, especially carboxylic acid groups and/or carboxylate groups (f2).

In the graft copolymers of the invention which are or may be present in the polymer mixtures of the invention, the proportion of graft base or core (polyurethane of the invention) to graft sheath or shell may vary extremely widely, which is a particular advantage of the polymer mixtures of the invention.

Further particular advantages result from the inventively preferred use of (potentially) anionic hydrophilic functional groups (f2), especially carboxylic acid groups, since in the graft copolymers of the invention the ratio of acid number of the shell to acid number of the core may likewise be varied widely.

The polymer mixtures of the invention may be isolated from the solutions or dispersions in which they are produced and put to a very wide variety of end uses, especially in solvent-containing, water- and solvent-free pulverulent solid or water- and solvent-free liquid coating materials, adhesives and sealing compounds. They are particularly suitable for preparing pigmented or unpigmented, conventional or aqueous coating materials, powder coating materials, powder slurry coating materials, or 100% systems.

In accordance with the invention, however, it is of advantage to use the dispersions of the invention, which in the procedure according to the invention are obtained either as primary dispersions or as secondary dispersions by dispersing the solutions of the polymer mixtures of the invention in water, as they are for the preparation of aqueous coating materials, adhesives and sealing compounds of the invention or as aqueous coating materials, adhesives and sealing compounds. In the case of use as coating materials, they exhibit outstanding film-forming properties.

The aqueous coating materials, adhesives and sealing compounds of the invention may be curable physically, thermally, or thermally and with actinic radiation.

In the context of the present invention, the term "physical curing" means the curing of a layer of a coating material, of an adhesive or of a sealing compound by the formation of a film as a result of loss of solvent from the coating material, adhesive or sealing compound, linking taking place within the coating by way of formation of loops of the polymer molecules of the binders (regarding the term cf. Römpp Lexikon Lacke und Druckfarben, Georg Thieme Verlag, Stuttgart, N.Y., 1998, "Binders", pages 73 and 74). Alternatively, the formation of a film takes place by way of the coalescence of binder particles (cf. Römpp Lexikon Lacke und Druckfarben, Georg Thieme Verlag, Stuttgart, N.Y., 1998, "Curing", pages 274 and 275). Normally, no crosslinking agents are required for this purpose. If desired, the physical curing can be assisted by atmospheric oxygen, heat, or exposure to actinic radiation.

In the context of the present invention, the term "self-crosslinking" denotes the property of a binder to undergo crosslinking reactions with itself. A precondition for this is that the binder already contains both types of complementary reactive functional groups necessary for crosslinking. Externally cross-linking, on the other hand, is used to denote those coating materials, adhesives and sealing compounds in which one type of the complementary reactive functional groups is present in the binder and the other type in a hardener, curing agent or crosslinking agent. For further details, refer to Römpp Lexikon Lacke und Druckfarben, Georg Thieme Verlag, Stuttgart, N.Y., 1998, "Curing", pages 274 to 276, especially page 275, at the bottom.

In the context of the present invention, actinic radiation is electromagnetic radiation, such as near infrared (NIR), visible light, UV radiation or X-radiation, especially UV radiation, and corpuscular radiation such as electron beams. If thermal curing and curing with actinic radiation are employed conjointly, the terms "dual cure" and "dual-cure coating material", "dual-cure adhesive" or "dual-cure sealing compound" are also used.

In addition to the polymer mixtures of the invention, the aqueous adhesives of the invention may include further suitable, customary and known constituents in effective amounts. Examples of suitable constituents are the crosslinking agents and additives described below, provided they are suitable for the preparation of adhesives.

Likewise, in addition to the polymer mixtures of the invention the aqueous sealing compounds of the invention may include further suitable, customary and known constituents in effective amounts. Examples of suitable constituents are, again, the crosslinkers and additives described below, provided they are suitable for the preparation of sealing compounds.

The inventive primary dispersions and secondary dispersions of the polymer mixtures of the invention are primarily suitable for preparing aqueous coating materials, especially aqueous surface coating materials. Examples of aqueous surface coating materials of the invention are surfacers, solid-color topcoats, aqueous basecoats, and clearcoats. The primary dispersions and secondary dispersions of the invention exhibit very particular advantages when used to prepare aqueous basecoat materials.

In the aqueous basecoat materials, the polymer mixtures of the invention are advantageously present in an amount of from 1.0 to 50, preferably from 2.0 to 40, with particular preference from 3.0 to 35, with very particular preference from 4.0 to 30, and in particular from 5.0 to 25, % by weight, based in each case on the overall weight of the respective aqueous basecoat material.

The further essential constituent of the aqueous basecoat material of the invention is at least one color and/or effect pigment. The pigments may consist of organic or inorganic compounds. Examples of suitable effect pigments are metal flake pigments such as commercial aluminum bronzes, aluminum bronzes chromated in accordance with DE 36 36 183 A1, and commercial stainless steel bronzes and also nonmetallic effect pigments, such as pearlescent pigments and interference pigments, for example, platelet-shaped effect pigments based on iron oxide having a color from pink to brownish red, or liquid-crystalline effect pigments. For further details, reference is made to Römpp Lexikon Lacke und Druckfarben, Georg Thieme Verlag, 1998, page 176 "Effect Pigments" and pages 380 and 381 "Metal Oxide-Mica Pigments" to "Metal Pigments" and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A or U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; color pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp Lexikon Lacke und Druckfarben, Georg Thieme Verlag, 1998, pages 180 and 181, "Iron Blue Pigments" to "Iron Oxide Black", pages 451 to 453, "Pigments" to "Pigment Volume Concentration", page 563, "Thioindigo Pigments", page 567, "Titanium Dioxide Pigments", pages 400 and 467, "Naturally Occurring Pigments", page 459 "Polycyclic Pigments", page 52, "Azomethine Pigments", "Azopigments", and page 379, "Metal Complex Pigments".

The aqueous basecoat material may comprise at least one crosslinker having the complementary reactive functional groups necessary for thermal crosslinking.

Examples of suitable crosslinkers are amino resins, as described for example in Römpp Lexikon Lacke und Druckfarben, Georg Thieme Verlag, 1998, page 29, "Amino Resins", in the textbook "Lackadditive" [Additives for Coatings] by Johan Bieleman, Wiley-VCH, Weinheim, N.Y., 1998, page 242 ff., in the book "Paints, Coatings and Solvents", second completely revised edition, Edit. D. Stoye and W. Freitag, Wiley-VCH, Weinheim, N.Y., 1998, page 80 ff., in the patents U.S. Pat. No. 4,710,542 A or EP 0 245 700 A1, and in the article by B. Singh and co-workers "Carbamylmethylated Melamines, Novel Crosslinkers for the Coatings Industry", in Advanced Organic Coatings Science and Technology Series, 1991, volume 13, pages 193 to 207; carboxyl-containing compounds or resins, as described for example in the patent DE 196 52 813 A1, resins or compounds containing epoxide groups, as described for example in the patents EP 0 299 420 A1, DE 22 14 650 B1, DE 27 49 576 B1, U.S. Pat. No. 4,091,048 A or U.S. Pat. No. 3,781,379 A; blocked polyisocyanates, as described for example in the patents U.S. Pat. No. 4,444,954 A1, DE 196 17 086 A1, DE 196 31 269 A1, EP 0 004 571 A1 or EP 0 582 051 A1; and/or tris(alkoxy-carbonylamino)triazines, as described in the patents U.S. Pat. No. 4,939,213 A, U.S. Pat. No. 5,084,541 A, U.S. Pat. No. 5,288,865 A or EP 0 604 922 A.

The use of crosslinkers can be omitted if the polymer mixtures of the invention that are present in the aqueous basecoats have self-crosslinking properties or crosslink physically.

In addition to the constituents described above, the aqueous basecoat material of the invention may include customary and known binders and/or additives in effective amounts.

Examples of customary and known binders are oligomeric and polymeric, thermally curable poly(meth)acrylates or acrylate copolymers which are linear and/or branched and/or of blocklike, comblike and/or random construction, especially the polyesters described in the patent DE 197 36 535 A1, in particular those described in the patents DE 40 09 858 A1 or DE 44 37 535 A1, alkyds, acrylated polyesters, polylactones, polycarbonates, polyethers, epoxy resin-amine adducts, (meth)acrylate diols, partially hydrolyzed polyvinyl esters, polyurethanes and acrylated polyurethanes, such as those described in the patent applications EP 0 521 928 A1, EP 0 522 420 A1, EP 0 522 419 A1, EP 0 730 613 A1 or DE 44 37 535 A1, or polyureas, or binders curable with actinic radiation, as described for example in the German patent application DE 198 35 206 A1.

Examples of suitable additives are organic and inorganic fillers, thermally curable reactive diluents or reactive diluents curable with actinic radiation (cf. Römpp Lexikon Lacke und Druckfarben, Stuttgart, N.Y., 1998, page 491), low-boiling organic solvents and/or high-boiling organic solvents ("long solvents"), UV absorbers, light stabilizers, free-radical scavengers, thermally labile free-radical initiators, photoinitiators, crosslinking catalysts, deaerating agents, slip additives, polymerization inhibitors, defoamers, emulsifiers, wetting agents, adhesion promoters, leveling agents, film-forming auxiliaries, rheology control additives, or flame retardants. Further examples of suitable coatings additives are described in the textbook "Lackadditive" by Johan Bieleman, Wiley-VCH, Weinheim, N.Y., 1998.

The preparation of the aqueous basecoat material of the invention has no special features but instead takes place in a customary and known manner by mixing the constituents described above in suitable mixing equipment such as stirred vessels, dissolvers, stirred mills, static mixers, toothed-wheel dispersers or extruders by the processes suitable for preparing the respective aqueous basecoat materials.

Of course, the above-described pigments, crosslinkers and other additives, and also the above-described methods, may also be employed to prepare the adhesives and sealing compounds of the invention.

The aqueous basecoat material is outstandingly suitable for the production of color and/or effect multicoat systems by the wet-on-wet technique, in which an aqueous basecoat film is applied, dried and overcoated with a clearcoat film, after which aqueous basecoat film and clearcoat film are cured together. As is known, this process is used with advantage in automobile OEM finishing and refinishing.

Owing to their particularly advantageous properties, however, the coating materials of the invention are, moreover, also suitable for the coating of interior and exterior architecture, for the coating of furniture, windows or doors, and for industrial coating, including coil coating, container coating, and the impregnation or coating of electrical components. In the context of industrial coating, they are suitable for coating virtually all parts for private or industrial use, such as radiators, domestic appliances, small metal parts such as screws and nuts, hubcaps, wheel rims, packaging, or electrical components such as motor windings or transformer windings.

The adhesives and sealing compounds of the invention are outstandingly suitable for the preparation of adhesive films and seals which even under extreme and/or rapidly changing climatic conditions, persistently, are of particularly high bond strength and sealing power.

Accordingly, the primed or unprimed substrates commonly employed in the abovementioned technological fields, and coated with at least one coating of the invention, bonded with at least one adhesive film of the invention, and/or sealed with at least one seal of the invention, combine a particularly advantageous profile of performance properties with a particularly long service life, which makes them particularly attractive from an economic standpoint.

EXAMPLES

Preparation Example 1

The Preparation of a Polyester Polyol

In a unit suitable for polyester synthesis, 891.2 parts by weight of Pripol® 1013 (commercial dimeric fatty acid), 292.8 parts by weight of 1,6-hexanediol, 360.3 parts by weight of isophthalic acid and 250.7 parts by weight of neopentyl glycol, with xylene as entrainer, were reacted until the acid number was <5 mg KOH/g. The xylene was subsequently removed by distillation and the polyester was allowed to react further until the acid number was from 3 to 4 mg KOH/g. The polyester was cooled to 110° C. and diluted with methyl ethyl ketone to a solids content of 73% by weight (theoretical). The number-average molecular weight was 2333 daltons, the mass-average molecular weight 4912 daltons.

Preparation Example 2

The Preparation of a Polyurethane Prepolymer Containing Isocyanate Groups

In a unit suitable for reacting isocyanates, 1535.1 parts by weight of the polyester solution as in Preparation Example 1, 160 parts by weight of dimethylolpropionic acid, 16 parts by weight of neopentyl glycol and 636 parts by weight of tetramethylxylylidene diisocyanate (TMXDI) were heated to 90° C. The resulting mixture was diluted with 413.9 parts by weight of methyl ethyl ketone to a solids content of 70% by weight (theoretical) and left to react until the isocyanate content was constant (2.16% by weight, based on the solids of the polyurethane prepolymer.

Example 1

The Preparation of an Inventive Polyurethane and of an Aqueous Dispersion thereof 1498 parts by weight of the solution of the isocyanato-containing polyurethane prepolymer from Preparation Example 1 were introduced into the unit at 90° C. 32.3 parts by weight of thiodiethanol were metered into this initial charge with stirring. The resulting mixture was stirred at 90° C. until isocyanate groups were no longer detectable. The solution of the polyurethane of the invention (theoretical solids content: 73.9% by weight) was neutralized with triethylamine at 82° C.

The neutralized solution was dispersed in 1686.5 parts by weight of water to give a dispersion with a solids content of 27.3% by weight.

Example 2

The Preparation of the Primary Dispersion of an Inventive Polymer Mixture

A customary and known polymerization vessel equipped with stirrer, reflux condenser and two feed vessels was charged with 2674.5 parts by weight of the dispersion from Example 1, which was heated to 82° C. Metered into this initial charge over 4 hours via the first feed vessel was a monomer mixture comprising 243 parts by weight of hydroxypropyl methacrylate, 70 parts by weight of n-butyl acrylate, 139 parts by weight of styrene, 139 parts by weight of tert-butylcyclohexyl acrylate and 104 parts by weight of methyl methacrylate, and 35 parts by weight of tert-butyl per-2-ethylhexanoate were metered in over the course of 4.5 hours via the second feed vessel, and the components were copolymerized at 82° C. Monomer feed and initiator feed were commenced simultaneously. After the end of the initiator feed, polymerization was continued for 1 hour. The resulting primary dispersion (theoretical solids content: 46.7% by weight) was diluted with 652.5 parts by weight of water. Its solids content (1 hour/130° C.) was 34.8% by weight, its acid number 23.1 mg KOH/g and its pH 7.1. The coagulum content was 0.06% by weight. The number average molecular weight of the graft copolymer of the invention was 8569 daltons, the mass average molecular weight 200,560 daltons.

The dispersion was poured onto glass, and after drying and physical curing gave glass-clear coatings. Furthermore, it was outstandingly suitable for the preparation of aqueous basecoat materials or of adhesives and sealing compounds.

The invention claimed is:

1. A polymer mixture, based on polyurethane, comprising a reaction product of at least one olefinically unsaturated monomer with at least one polyurethane containing sulfide groups, the polyurethane comprising at least one of i) at least one group of general formula I in the polymer main chain, and ii) at least two terminal groups of general formula II:

—X—A—S—B—Y—     (I)

—X—A—S—B—YH     (II)

wherein:
S is a sulfur atom:
X and Y independently of one another are oxygen atoms, sulfur atoms, or groups —NZ, wherein Z is a hydrogen atom or an alkyl radical of 1 to 10 carbon atoms; and
A and B independently of one another are divalent organic radicals, wherein the reaction product is in a solution or in an aqueous dispersion.

2. A composition comprising the polymer mixture of claim 1, wherein the composition is one of a coating material, an adhesive, or a sealing compound.

3. The composition of claim 2, wherein the composition is curable physically, thermally, or thermally and with actinic radiation.

4. The composition of claim 2, wherein an application product of the composition is one of an automotive OEM finish an automotive refinish, an interior architectural coating, an exterior architectural coating, a furniture coating, a window coating, a door coating, an industrial coating, a coil coating, a container coating, an impregnation for an electrical component, or an electrical component coating.

* * * * *